United States Patent
Ran et al.

(10) Patent No.: US 9,627,703 B2
(45) Date of Patent: Apr. 18, 2017

(54) MEDIUM AND HIGH-TEMPERATURE CARBON-AIR CELL

(71) Applicant: NANJING UNIVERSITY OF TECHNOLOGY, Nanjing, Jiangsu (CN)

(72) Inventors: Ran Ran, Nanjing (CN); Huangang Shi, Nanjing (CN); Binbin Yang, Nanjing (CN); Guangming Yang, Nanjing (CN); Chao Li, Nanjing (CN); Zongping Shao, Nanjing (CN)

(73) Assignee: NANJING UNIVERSITY OF TECHNOLOGY, Nanjing (CN)

( * ) Notice: Subject to any disclaimer, the term of this patent is extended or adjusted under 35 U.S.C. 154(b) by 260 days.

(21) Appl. No.: 14/387,942

(22) PCT Filed: Mar. 26, 2013

(86) PCT No.: PCT/CN2013/073226
§ 371 (c)(1),
(2) Date: Sep. 25, 2014

(87) PCT Pub. No.: WO2013/143452
PCT Pub. Date: Oct. 3, 2013

(65) Prior Publication Data
US 2015/0050579 A1    Feb. 19, 2015

(30) Foreign Application Priority Data

Mar. 28, 2012 (CN) .......................... 2012 1 0085404

(51) Int. Cl.
*H01M 8/12* (2016.01)
*H01M 8/1233* (2016.01)
(Continued)

(52) U.S. Cl.
CPC ....... *H01M 8/1233* (2013.01); *H01M 4/9025* (2013.01); *H01M 8/004* (2013.01);
(Continued)

(58) Field of Classification Search
CPC ... H01M 8/004; H01M 8/0252; H01M 8/1233
See application file for complete search history.

(56) References Cited

U.S. PATENT DOCUMENTS

| 7,799,472 | B2 | 9/2010 | Gur |
| 2006/0257702 | A1 | 11/2006 | Gur |
| 2011/0014526 | A1 | 1/2011 | Gur |

FOREIGN PATENT DOCUMENTS

| CN | 101203971 A | 6/2008 |
| CN | 101540411 A | 9/2009 |

(Continued)

OTHER PUBLICATIONS

International Search Report issued in International Application No. PCT/CN2013/073226 mailed on Jul. 4, 2013.
(Continued)

*Primary Examiner* — Jayne Mershon
(74) *Attorney, Agent, or Firm* — Oliff PLC (57) ABSTRACT

The present invention relates to a medium and high-temperature carbon-air cell, which include a solid oxide fuel cell, a $CO_2$ separation membrane and a carbon fuel. The solid oxide fuel cell is a tubular solid oxide fuel cell with one end closed, the carbon fuel is placed inside the tubular solid oxide fuel cell, and the $CO_2$ separation membrane is sealed at the open end of the solid oxide fuel cell. In the carbon-air cell, with carbon as fuel and oxygen in the air as an oxidizing gas, electrochemical reactions occur. The carbon-air cell of the present invention has a novel structural design, and can achieve electricity generation with the solid oxide fuel cell without externally charging a gas, and at the same time, $CO_2$
(Continued)

generated inside the solid oxide fuel cell can be discharged from the system through the $CO_2$ separation membrane in time.

8 Claims, 5 Drawing Sheets

(51) Int. Cl.
*H01M 8/124* (2016.01)
*H01M 4/90* (2006.01)
*H01M 8/00* (2016.01)
*H01M 8/1009* (2016.01)

(52) U.S. Cl.
CPC ......... *H01M 8/1009* (2013.01); *H01M 8/124* (2013.01); *H01M 2008/1293* (2013.01); *H01M 2300/0074* (2013.01); *H01M 2300/0077* (2013.01); *Y02E 60/525* (2013.01); *Y02P 70/56* (2015.11)

(56) References Cited

FOREIGN PATENT DOCUMENTS

| | | |
|---|---|---|
| CN | 102610842 A | 7/2012 |
| JP | A-2004-296366 | 10/2004 |

OTHER PUBLICATIONS

International Preliminary Report on Patentability issued in International Application No. PCT/CN2013/073226 dated Oct. 1, 2014.

MEDIUM AND HIGH-TEMPERATURE CARBON-AIR CELL

BACKGROUND

Technical Field

The present invention relates to the field of solid oxide fuel cells, and more particularly to a medium and high-temperature (the operating temperature is 500° C. to 900° C.) carbon-air cell based on a solid oxide fuel cell and a $CO_2$ separation membrane, which is an energy storage cell with carbon as fuel.

Related Art

Fuel cells, as an electrochemical energy conversion device, can continuously convert fuel into electricity, and have energy conversion efficiency greater than conventional thermal power generation and energy density higher than common energy storage cells, and thus attract broad attention of people. Among various fuel cells, solid oxide fuel cells (SOFCs), as a type of high-temperature fuel cells, have a prominent advantage of fuel diversity, and in addition to hydrogen, hydrocarbons, carbon hydroxide compounds, ammonia, CO, even solid carbon can be used as fuel of SOFCs. As a fuel of fuel cells, solid carbon has various advantages compared with other fuels: (1) having high energy density, heat released by combustion of carbon is 20.0 kWh $L^{-1}$, much higher than that of many other widely used fuels such as hydrogen (2.4 kWh $L^{-1}$), methane (4.0 kWh $L^{-1}$), gasoline (9.0 kWh $L^{-1}$) and diesel (9.8 kWh $L^{-1}$); (2) having a very rich source, solid carbon can be obtained through pyrolysis of coal, petroleum coke, biomass or organic waste, especially coal is the most abundant fossil fuel reserved on the earth and accounts for nearly 60% of all fossil fuels; (3) being safe and nontoxic, the solid carbon has a very distinct advantage in storage, transportation and preparation compared with hydrogen; (4) compared with cells with hydrogen as a fuel, hydrogen embrittlement does not exist in cells with carbon as a fuel, so silver can be conveniently used as a sealant, and the cells are suitable for long-term operation.

For carbon-air cells constructed with carbon as a built-in fuel, the theoretical capacity may be up to 8935 mAh $g^{-1}$, which is nearly 25 times of the theoretical capacity (365 mAh $g^{-1}$) of current lithium cells with carbon as the pole, and is more than twice of the capacity of lithium cells with elemental silicon as the pole; moreover, the charging process (regeneration) of carbon-air cells can be easily and conveniently achieved by adding carbon fuel. Because a cathode of the cell is an air pole, and the capacity of the cell is almost not restricted by the cathode, the theoretical capacity of the cell can be 40% to 60% of carbon capacity, which is dozens of times of the capacity of current lithium-ion cells. Additionally, carbon is a very stable fuel, so that carbon-air cells are expected to make breakthroughs in achieving high-capacity and high-safety energy storage cells, but currently there are very few reports about carbon-air cells for energy storage, because electrochemical oxidation of carbon is very difficult and it is difficult to achieve electrochemical oxidation of carbon by a conventional low-temperature electrochemical process. Additionally, compared with a conventional fuel cell, an energy storage cell is a closed system, and the direct carbon fuel cell will generate $CO_2$ in gas state, so that an additional $CO_2$ separation system is required, thereby greatly increasing the complexity of the cell, and reducing the volumetric energy density and weight energy density of the cell.

SUMMARY

In order to solve problems in the prior art that the power density of the current direct carbon fuel cell is low, and a gas needs to be externally charged, and the structure is complex, the present invention develops a medium and high-temperature carbon-air cell using solid carbon as fuel and based on a tubular solid oxide fuel cell and a $CO_2$ separation membrane.

Figure 1:
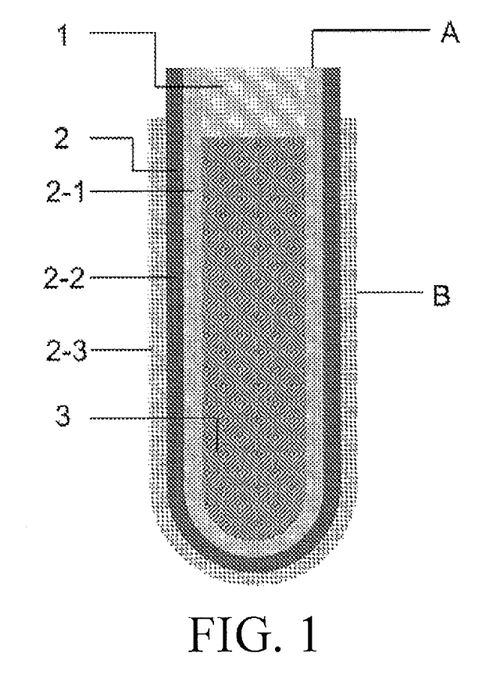
FIG. 1 is a schematic diagram of a carbon-air cell according to the present invention, where 1 is a $CO_2$ separation membrane, 2 is a solid oxide fuel cell, 3 is a carbon fuel, A is a negative pole (anode), and B is a positive pole (cathode)

The specific technical solution of the present invention is as follows: A medium and high-temperature carbon-air cell includes a solid oxide fuel cell 2, a $CO_2$ separation membrane 1 and a carbon fuel 3. The solid oxide fuel cell is a tubular solid oxide fuel cell with one end closed, the carbon fuel 3 is placed inside in the tubular solid oxide fuel cell 2, and the $CO_2$ separation membrane 1 is sealed at the open end of the solid oxide fuel cell 2; in the carbon-air cell, with carbon as fuel, oxygen in the air as oxidizing gas, electrochemical reactions occur. At an operating temperature, the carbon fuel reacts with $CO_2$, and CO is generated; then CO is supplied to the anode as fuel, and reacts with $O_2$ transferred from the cathode, so as to generate $CO_2$; a part of the generated $CO_2$ reacts with carbon, and the rest of the generated $CO_2$ is transferred out through the $CO_2$ separation membrane.

Figure 3:
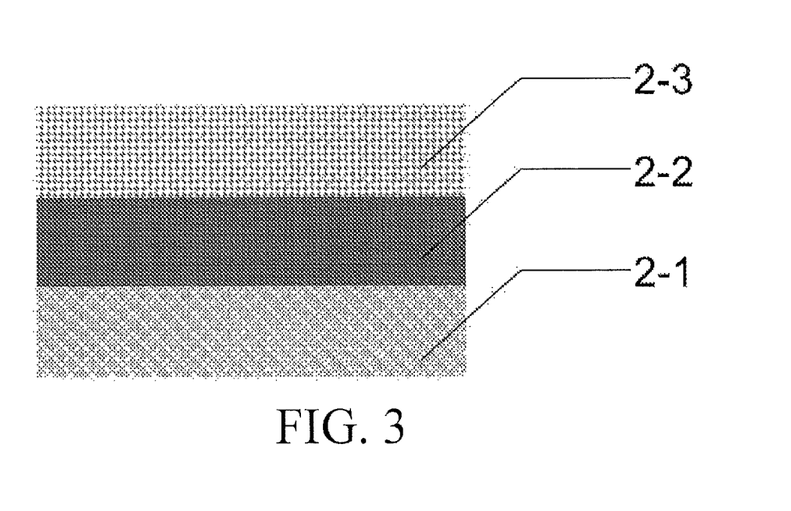
FIG. 3 is a schematic structural diagram of a solid oxide fuel cell according to the present invention, where 2-1 is an anode, 2-2 is an electrolyte, and 2-3 is a cathode.

Preferably, the solid oxide fuel cell 2 has an anode-supported configuration, an electrolyte-supported configuration or a cathode-supported configuration; the solid oxide fuel cell 2 includes three layers, an anode 2-1, an electrolyte 2-2 and a cathode 2-3, the anode 2-1 is located inside the cell tube, the cathode 2-3 is located outside the cell tube, and the electrolyte 2-2 layer is located between the anode 2-1 and the cathode 2-3.

Preferably, the electrolyte 2-2 of the solid oxide fuel cell is one or two or a combination of more than two of stabilized zirconia material (such as yttria-stabilized zirconia, YSZ), a doped ceria material (such as gadolinia doped ceria, GDC), doped lanthanum gallate (such as strontium and magnesium doped lanthanum gallate, LSGM) and doped bismuth oxide (yttria doped bismuth oxide, YSB); and the combination form is mixing or multi-layer stacking.

Preferably, the solid oxide fuel cell anode 2-1 is a mixture of the electrolyte 2-2 and one or more of elemental metals Ni, Pt, Ag, Ru, Fe and Cu, where the mass fraction of the elemental metal in the mixture is 10% to 90%; or a perovskite material such as LSSM and LSCM.

Preferably, the solid oxide fuel cell cathode 2-3 is a mixture of one of $La_{0.8}Sr_{0.2}MnO_3$, $La_{0.6}Sr_{0.4}Co_{0.2}Fe_{0.8}O_3$, $Ba_{0.5}Sr_{0.5}Co_{0.8}Fe_{0.2}O$, $La_2NiO_4$, $PrBaCoO_5$, Pt, Ag—$Sm_{0.2}Ce_{0.8}O_{1.9}$ or Ag—$La_{0.8}Sr_{0.2}MnO_3$ and the electrolyte 2-2, where the mass fraction of the electrolyte material in the mixture is 0 to 90%.

The operating temperature of the medium and high-temperature carbon-air cell of the present invention is 500° C. to 900° C.

Figure 2:
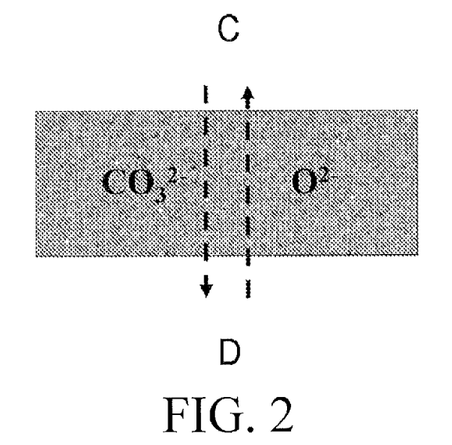
FIG. 2 is a schematic diagram of a $CO_2$ separation membrane according to the present invention, where C is the inside of the cell, and D is the outside of the cell.

Preferably, the $CO_2$ separation membrane 1 is an inorganic material, and preferably formed by pressing a mixture of a carbonate and a high-temperature oxygen ion conductor; where the mass fraction of the carbonate in the mixture is 20% to 80%; and preferably, the carbonate is one or more of $Li_2CO_3$, $NaCO_3$ and $K_2CO_3$; and the high-temperature oxygen ion conductor is one ore more of SDC, GDC and YSZ.

The carbon fuel of the present invention is preferably elemental carbon or a carbon-containing compound or mixture, and more preferably charcoal, bamboo charcoal, activated carbon, coke, amorphous carbon, powdered coal or graphite, or a combination thereof.

The medium and high-temperature carbon-air cell of the present invention is prepared through the following steps:

(1) Preparation of the Solid Oxide Fuel Cell

According to a method for preparation a tubular solid oxide fuel cell with one end sealed, a conventional ceramic preparation method, such as a casting method, is used to prepare a solid oxide fuel cell support tube, where the support tube may be made of an anode material or a cathode material, and may also be made of an electrolyte material. After an appropriate sintering process, the rest electrolyte or electrode layer is prepared by adopting a coating method or an impregnation method, to finally obtain an anode | electrolyte| cathode structure, where the anode layer is located inside the tube, and the cathode layer is located outside the tube.

(2) Preparation of the $CO_2$ Separation Membrane

The $CO_2$ separation membrane of the present invention is prepared by mixing a composite of an oxygen ion conductor and a molten carbonate, in which a suitable oxygen ion conductor and a carbonate material are selected, and after mechanical mixing, the composite are molded through dry pressing or isostatic pressing, to prepare a $CO_2$ separation membrane having a size corresponding to that of the tubular solid oxide fuel cell. By adjusting the proportion of the oxygen ion conductor and the molten carbonate in the material, the $CO_2$ infiltrability of the $CO_2$ separation membrane can be controlled, and the mass fraction of the carbonate is 20% to 80%.

(3) Assembling of the Carbon-Air Cell

According to the manner in FIG. 1, the carbon fuel is injected into the solid oxide fuel cell tube, and then the open end of the solid oxide fuel cell tube is sealed with the $CO_2$ separation membrane (a high temperature resistant metal rubber or a ceramic adhesive is selected as the sealant) to form a carbon-air cell, where the solid oxide fuel cell cathode out going line is the positive pole (B) of the cell, and solid oxide fuel cell anode out going line is the negative pole (A) of the cell.

(4) Operation of the Carbon-Air Cell

When the single cell of the present invention is operated, the carbon-air cell is directly heated to an operating temperature, and the cathode is charged with air or is directly exposed in the air; in this way, electrochemical reactions occur, electricity is generated, and the cell is used as power source.

Beneficial Effects

The carbon-air cell of the present invention has a novel structural design, and can achieve electricity generation by the solid oxide fuel cell without external gas charge, and at the same time, the $CO_2$ gas generated inside the solid oxide fuel cell can be discharged from the system through the $CO_2$ separation membrane. Because carbon has high energy density, and the cathode uses the air, the carbon-air cell of the present invention has a high energy density, and has a high application value.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The method involved in the present invention includes, but not limited to, materials in the following embodiments.

Embodiment 1: An NiO-YSZ anode support tube was prepared by a casting method, and the support tube was dried and then sintered at 1100° C. A layer of YSZ electrolyte film was prepared on the anode support surface by a spraying method, and the electrolyte film was sintered at 1400° C. to obtain a half-cell. The half-cell was subjected to high-temperature reduction (750° C.) for 2 hours under hydrogen atmosphere to obtain an anode reduced half-cell, and the mass fraction of YSZ in the reduced anode support tube was 50%. Next, a layer of LSM cathode was sprayed on the half-cell surface, and then sintered for 5 hours at 1100° C. under inert atmosphere to obtain an anode supported tubular solid oxide fuel cell. As shown in FIG. 1, activated carbon was filled inside the solid oxide fuel cell tube, and naturally stacked to a level about 1 cm from the tube orifice. Elargol was coated on the cathode surface of the solid oxide fuel cell as a current collector, and wires were respectively introduced from the cathode and the anode as the positive pole and the negative pole.

Figure 4:
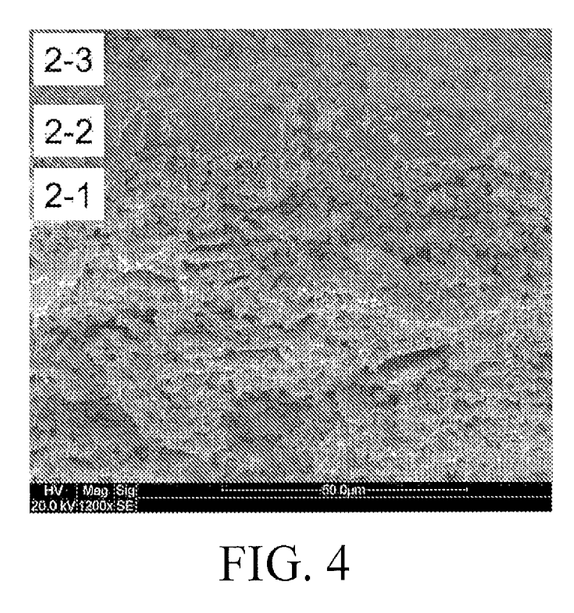
FIG. 4 is a cross-section morphology of a single cell according to Embodiment 1 after test.

YSZ and $K_2CO_3$ were mixed at a mass ratio of 2:1 (mass ratio), and then the mixture was subjected to isostatic pressing to prepare a sheet having a cross-section size the same as that of the tubular solid oxide fuel cell as the $CO_2$ separation membrane, and the open end of the tubular solid oxide fuel cell was sealed with the $CO_2$ separation membrane by elargol to obtain a carbon-air cell. The schematic diagram of the carbon-air cell after assembly is shown in FIG. 1. The microtopography of the cross-section of the solid oxide fuel cell is shown in FIG. 4, and it can be seen from FIG. 4 that, the electrolyte layer is compact, and the anode layer and the cathode layer are porous.

The carbon-air cell works at 800° C., the open-circuit voltage is 0.86 V, the power density is up to 150 mWcm$^{-2}$, and the cell capacity is up to 4200 mAh g$^{-1}$, Embodiment 2: A GDC electrolyte support tube was prepared by a casting method, and the support tube was dried and then sintered at 1400° C. A layer of GDC-CuO anode film was prepared on the inner surface of the electrolyte support tube by an impregnation method, and then sintered at 1400° C. to obtain a half-cell. The half-cell was subjected to high-temperature reduction (750° C.) for 2 hours under hydrogen atmosphere to obtain an anode reduced half-cell, and the mass fraction of Cu in the reduced anode support tube was 30%. Next, a layer of LSCF electrode was sprayed on the half-cell surface, and then sintered for 5 hours at 1100° C. under inert atmosphere to obtain an electrolyte supported tubular solid oxide fuel cell. Activated carbon was filled inside the solid oxide fuel cell tube, elargol was coated on the cathode surface of the oxide fuel cell as a current collector, and wires were respectively introduced from the cathode and the anode as the positive pole and the negative pole.

GDC and $K_2CO_3$ were mixed at a mass ratio of 1:1 (mass ratio), and then the mixture was subjected to isostatic pressing to prepare a sheet having a cross-section size the same as that of the tubular solid oxide fuel cell as the $CO_2$ separation membrane, and the open end of the tubular solid oxide fuel cell was sealed with the $CO_2$ separation membrane by elargol to obtain a carbon-air cell.

The carbon-air cell works at 900° C., the open-circuit voltage is 0.72 V, the power density is up to 150 mWcm$^{-2}$, and the cell capacity is up to 2800 mAh g$^{-1}$.

Embodiment 3: A cathode support tube was prepared by a casting method, and the support tube was dried and then sintered at 1000° C. A layer of YSZ electrolyte film was prepared on the inner surface of the cathode support tube by an impregnation method, and then sintered at 1300° C. to obtain a half-cell. A layer of SDC-NiO anode was prepared on the inner surface of the half-cell through impregnation, and then sintered for 5 hours at 1300° C. under air atmosphere to obtain an anode unreduced tubular solid oxide fuel cell. The tubular solid oxide fuel cell was subjected to high-temperature reduction (750° C.) for 2 hours under hydrogen atmosphere to obtain an anode reduced cathode supported tubular solid oxide fuel cell, and the mass fraction of Ni in the reduced anode support tube was 60%. Activated carbon was filled inside the solid oxide fuel cell tube, elargol was coated on the cathode surface of the solid oxide fuel cell cathode as a current collector, and wires were respectively introduced from the cathode and the anode as the positive pole and the negative pole.

YSZ and $K_2CO_3$ were mixed at a mass ratio of 3:1 (mass ratio), and then the mixture was subjected to isostatic pressing to prepare a sheet having a cross-section size the same as that of the tubular solid oxide fuel cell as the $CO_2$ separation membrane, and the open end of the tubular solid oxide fuel cell was sealed with the $CO_2$ separation membrane by elargol to obtain a carbon-air cell.

The carbon-air cell works at 500° C., the open-circuit voltage is 0.84 V, the power density is up to 40 mWcm$^{-2}$, and the cell capacity is up to 3800 mAh g$^{-1}$.

Embodiment 4: NiO and YSZ were mixed, and the mixture was added with water and an adhesive, and then ball-milled for 1 hour; the mixture was added with 5% (mass fraction) Arabic gum and continuously ball-milled for 1 hour, to obtain slurry having a solid content of 70% (mass fraction). The slurry was casted into a construction mold to obtain an anode support tube, and the support tube was dried and then sintered at 1100° C. A layer of YSZ electrolyte film was prepared on the anode support surface by a spraying method, the electrolyte film was sintered at 1400° C., and then an SDC electrolyte layer was prepared on the YSZ electrolyte film by spraying and sintered at 1300° C. to obtain a half-cell. The half-cell was subjected to high-temperature reduction (750° C.) for 2 hours under hydrogen atmosphere to obtain an anode reduced half-cell, and the mass fraction of Ni in the reduced anode support tube was 20%. Next, a layer of BSCF electrode was prepared on the half-cell surface by spraying, and then sintered for 2 hours at 1000° C. under inert atmosphere to obtain an anode supported tubular solid oxide fuel cell. Graphite powder was filled inside the solid oxide fuel cell tube, elargol was coated on the cathode surface of the solid oxide fuel cell as a current collector, and wires were respectively introduced from the cathode and the anode as the positive pole and the negative pole.

Figure 5:
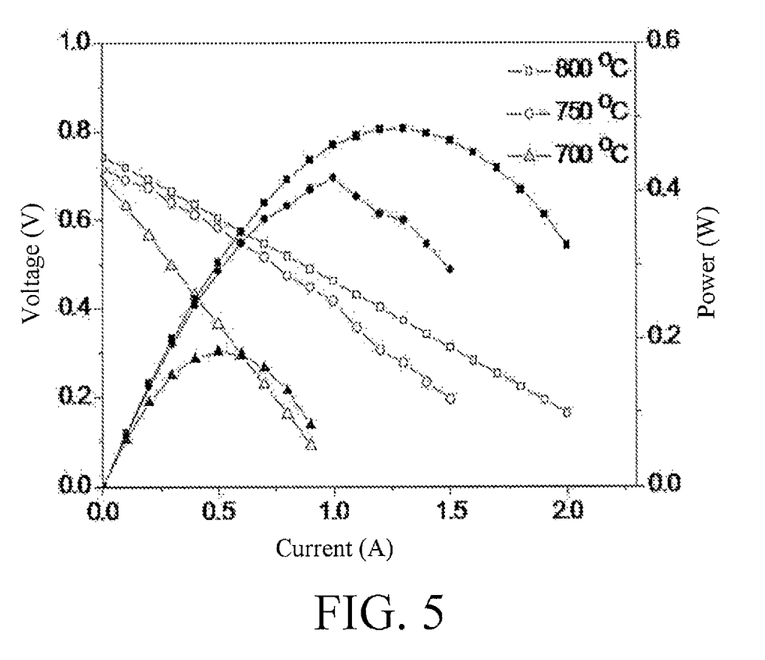
FIG. 5 is a performance chart of a single cell according to Embodiment 4 in test.

SDC and $K_2CO_3$ were mixed at a mass ratio of 1:1 (mass ratio), and then the mixture was subjected to dry pressing to prepare a sheet having a cross-section size the same as that of the tubular solid oxide fuel cell as the $CO_2$ separation membrane, and the open end of the tubular solid oxide fuel cell was sealed with the $CO_2$ separation membrane by elargol to obtain a carbon-air cell. Results of test of the single cell at 700° C., 750° C. and 800° C. are shown in FIG. 5, and it can be seen from FIG. 5 that, the open-circuit voltages of the carbon-air cell are respectively 0.71 V, 0.75 V and 0.78 V, and the maximal powers are respectively 0.17 W, 0.42 W and 0.48 W.

Embodiment 5: The process was the same as that in Embodiment 4, except that the carbon fuel was changed from graphite powder into powered coal.

The carbon-air cell works at 700° C., the open-circuit voltage is 0.88 V, the power density is up to 110 mWcm$^{-2}$, and the cell capacity is up to 4400 mAh g$^{-1}$.

Embodiment 6: The process was the same as that in Embodiment 4, except that the $CO_2$ separation membrane was prepared by $Na_2CO_3$ and SDC at a ratio of 1:2 (mass ratio) through mixing and dry pressing.

The carbon-air cell works at 700° C., the open-circuit voltage is 0.85 V, the power density is up to 100 mWcm$^{-2}$, and the cell capacity is up to 3900 mAh g$^{-1}$.

Embodiment 7: The process was the same as that in Embodiment 4, except that the $CO_2$ separation membrane was prepared by $Na_2CO_3$, $Li_2CO_3$ and GDC at a ratio of 1:1:2 (mass ratio) through mixing and dry pressing.

The carbon-air cell works at 700° C., the open-circuit voltage is 0.88 V, the power density is up to 130 mWcm$^{-2}$, and the cell capacity is up to 4300 mAh g$^{-1}$.

What is claimed is:
1. A medium and high-temperature carbon-air cell, comprising:
   a solid oxide fuel cell having a tubular structure with one end closed;
   a $CO_2$ separation membrane sealing an open end of the tubular structure, the $CO_2$ separation membrane being an inorganic material that is formed by pressing a mixture of a carbonate and a high-temperature oxygen ion conductor, wherein the mass fraction of the carbonate in the mixture is 20% to 80%; and
   a carbon fuel placed inside the tubular structure, wherein electrochemical reactions occur in response to carbon being supplied as fuel, and oxygen in the air being supplied as an oxidizing gas.
2. The carbon-air cell according to claim 1, wherein
   the solid oxide fuel cell has an anode-supported configuration, an electrolyte-supported configuration or a cathode-supported configuration;
   the solid oxide fuel cell comprises three layers that include an anode, an electrolyte and a cathode; and
   the anode is located inside a cell tube, the cathode is located outside the cell tube, and an electrolyte layer is located between the anode and the cathode.
3. The carbon-air cell according to claim 2, wherein
   the electrolyte layer of the solid oxide fuel cell is at least one or a combination of stabilized zirconia, doped ceria and doped lanthanum gallate; and
   the combination form is mixing or multi-layer stacking.
4. The carbon-air cell according to claim 2, wherein
   the anode of the solid oxide fuel cell is a mixture of an electrolyte material and at least one of: (i) an elemental metals Ni, Pt, Ag, Ru, Fe and Cu, or (ii) a perovskite material, and the mass fraction of the elemental metal in the mixture is 10% to 90%.

5. The carbon-air cell according to claim 2, wherein
the cathode of the solid oxide fuel cell is a mixture of at least $La_{0.8}Sr_{0.2}MnO_3$, $La_{0.6}Sr_{0.4}Co_{0.2}Fe_{0.8}O_3$, $Ba_{0.5}Sr_{0.5}Co_{0.8}Fe_{0.2}O$, $La_2NiO_4$, $PrBaCoO_5$, Pt, Ag—$Sm_{0.2}Ce_{0.8}O_{1.9}$ or Ag—$La_{0.8}Sr_{0.2}MnO_3$ and an electrolyte material, and
the mass fraction of the electrolyte material in the mixture is 0 to 90%.

6. The carbon-air cell according to claim 1, wherein an operating temperature of the carbon-air cell is 500° C. to 900° C.

7. The carbon-air cell according to claim 1, wherein
the carbonate includes at least $Li_2CO_3$, $NaCO_3$ or $K_2CO_3$; and
a high-temperature oxygen ion conductor at least is SDC, GDC or YSZ.

8. The carbon-air cell according to claim 1, wherein the fuel carbon is at least one of charcoal, bamboo charcoal, activated carbon, coke, amorphous carbon, powdered coal or graphite, or a combination thereof.

\* \* \* \* \*